(12) United States Patent
Dahlberg et al.

(10) Patent No.: US 7,093,633 B2
(45) Date of Patent: Aug. 22, 2006

(54) SELF-SUPPORTING PNEUMATIC TIRE

(75) Inventors: Johan Peter Dahlberg, Luxembourg (LU); Laurent Luigi Domenico Colantonio, Bastogne (BE); Walter Dale Allen, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 144 days.

(21) Appl. No.: 10/696,620

(22) Filed: Oct. 29, 2003

(65) Prior Publication Data

US 2005/0092415 A1 May 5, 2005

(51) Int. Cl.
*B60C 3/00* (2006.01)
*B60C 17/00* (2006.01)

(52) U.S. Cl. .................... 152/454; 152/516; 152/517; 301/95.101

(58) Field of Classification Search ................ 152/454, 152/516, 517; 301/95.101
See application file for complete search history.

(56) References Cited

U.S. PATENT DOCUMENTS

| | | | |
|---|---|---|---|
| 4,070,436 A | 1/1978 | Gardner et al. ............. | 264/315 |
| 4,345,634 A | 8/1982 | Giron ..................... | 152/353 R |
| 4,513,802 A | 4/1985 | Togashi et al. ......... | 152/353 R |
| 4,662,416 A | 5/1987 | Yagi et al. .............. | 152/209 R |
| 4,669,519 A | 6/1987 | Togashi et al. ............. | 152/454 |
| 4,867,218 A | 9/1989 | Asano et al. ............... | 152/454 |
| 5,117,886 A | 6/1992 | Tokutake ..................... | 152/454 |
| 5,445,202 A | 8/1995 | Nguyen et al. ............. | 152/454 |
| 6,230,773 B1 | 5/2001 | Sandstrom et al. ......... | 152/517 |

*Primary Examiner*—Justin Fischer
(74) *Attorney, Agent, or Firm*—Nancy T. Krawczyk

(57) ABSTRACT

A self-supporting pneumatic tire is molded in such a manner that ride comfort is improved, durability is increased, and a greater run-flat capability can be achieved. The self-supporting run-flat tire is molded such that the molded bead base width is equal or less than the rim width of the intended rim upon which the tire is to be mounted. By molding the tire with a bead width less than or equal to the rim width, the sidewall inserts are not subjected to additional stress during and after inflation of the tire and the strain energy is more evenly distributed through the sidewall pillar construction.

6 Claims, 5 Drawing Sheets

SELF-SUPPORTING PNEUMATIC TIRE

FIELD OF THE INVENTION

The present invention is directed to a pneumatic radial tire capable of running in conditions wherein the tire is operated at less than conventional inflation pressure. More specifically, the present invention is directed to a method of molding such a tire wherein the stresses of the tire generated during mounting, inflating, and loading are varied to affect the performance of the tire.

BACKGROUND OF THE INVENTION

Self-supporting run-flat tires have been commercialized for many years. The primary characteristic of such tires is an increase in the cross-sectional thickness of the sidewalls to strengthen the sidewalls. These tires, when operated in the uninflated condition, place the reinforcing sidewall inserts in compression. Due to the large amounts of rubber required to stiffen the sidewall members, heat build-up is a major factor in tire failure. This is especially true when the tire is operated for prolonged periods at high speeds in the uninflated condition.

U.S. Pat. No. 5,368,082 teaches the employment of special sidewall inserts to improve stiffness. Approximately six additional pounds of weight per tire are required to support an 800 lb load in an uninflated tire. The earliest commercial use of such runflat tires were used on a high performance vehicle and had a very low aspect ratio. The required supported weight for an uninflated luxury car tire, having an aspect ratios in the 55% to 65% range or greater, approximates 1400 lbs load. Such higher loads for larger run-flat tires meant that the sidewalls and overall tire had to be stiffened to the point of compromising ride. Luxury vehicle owners simply will not sacrifice ride quality for runflat capability. The engineering requirements have been to provide a runflat tire with no loss in ride or performance. In the very stiff suspension performance type vehicle the ability to provide such a tire was comparatively easy when compared to luxury sedans with a softer ride characteristic. Light truck and sport utility vehicles, although not as sensitive to ride performance, provide a runflat tire market that ranges from accepting a stiffer ride to demanding the softer luxury type ride.

SUMMARY OF THE INVENTION

The present invention is directed to a self-supporting tire. The self-supporting tire is molded in such a manner that ride comfort is improved, durability is increased, and a greater run-flat capability can be achieved. The self-supporting run-flat tire is molded such that the molded bead base width is equal or less than the rim width of the intended rim upon which the tire is to be mounted.

More specifically, the tire has a carcass, a tread, and a belt reinforcing structure located radially outward of the carcass and radially inward of the tread. The carcass is comprised of a reinforcing ply structure extending between a pair of bead portions, a pair of sidewalls, each sidewall located radially outward of one of the pair of bead portions, and an insert located in each sidewall. Each bead portion has a bead heel wherein the axial distance between the two bead heels before the tire is inflated is equal or less than after the tire is inflated. By providing for bead heels with such a defined width, inserts are not subjected to additional stress upon inflation. This in effect, changes the loading on the inserts and the carcass ply, leading to improved tire characteristics.

In various aspects of the disclosed tire, the tire has inserts in each sidewall located axially inward of the carcass reinforcing ply structure, or may have a pair of inserts, with one insert located axially inward of the carcass reinforcing ply structure and another located axially outward of the carcass reinforcing ply structure.

In another aspect of the invention, the self-supporting run-flat inserts in each sidewall may be formed of two different elastomeric materials.

In another aspect of the invention, the bead portions comprise bead cores with one bead core located in each bead portion. The run-flat insert in each sidewall has a radially outer end and radially inner end with the radially outer end being located radially inward of the belt reinforcing structure and the radially inner end of the insert being located radially outward of the bead cores.

Also discloses is a method of mounting a self-supporting run-flat pneumatic tire. The method comprises the steps of forming a tire, providing a rim, and mounting the tire. The tire so formed has a carcass, the carcass comprising a reinforcing ply structure extending between a pair of bead portions, a pair of sidewalls. Each sidewall has an insert located therein. The bead portions have a bead heel at the axially outermost point of the bead portion and the axial distance between opposing bead heels is a distance A. The rim provided has a rim seat distance B, the rim seat distance B being greater or equal to the tire distance A.

Definitions

The following definitions are controlling for the disclosed invention.

"Apex" means an elastomeric filler located radially above the bead core and between the plies and the turnup ply.

"Annular"; formed like a ring.

"Axial" and "axially" are used herein to refer to lines or directions that are parallel to the axis of rotation of the tire.

"Circumferential" means lines or directions extending along the perimeter of the surface of the annular tire parallel to the Equatorial Plane (EP) and perpendicular to the axial direction.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design rim width" is the specific commercially available rim width assigned to each tire size.

"Inner" means toward the inside of the tire and "outer" means toward its exterior.

"Self-supporting run-flat" means a type of tire that has a structure wherein the tire structure alone is sufficiently strong to support the vehicle load when the tire is operated in the uninflated condition for limited periods of time and speed, the sidewall and internal surfaces of the tire not collapsing or buckling onto themselves, without requiring any internal devices to prevent the tire from collapsing.

"Sidewall insert" means elastomer or cord reinforcements located in the sidewall region of a tire; the insert being in addition to the carcass reinforcing ply and outer sidewall rubber that forms the outer surface of the tire.

"Spring Rate" means the stiffness of tire expressed as the slope of the load deflection curve at a given pressure.

"Vertical Deflection" means the amount that a tire deflects under load.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
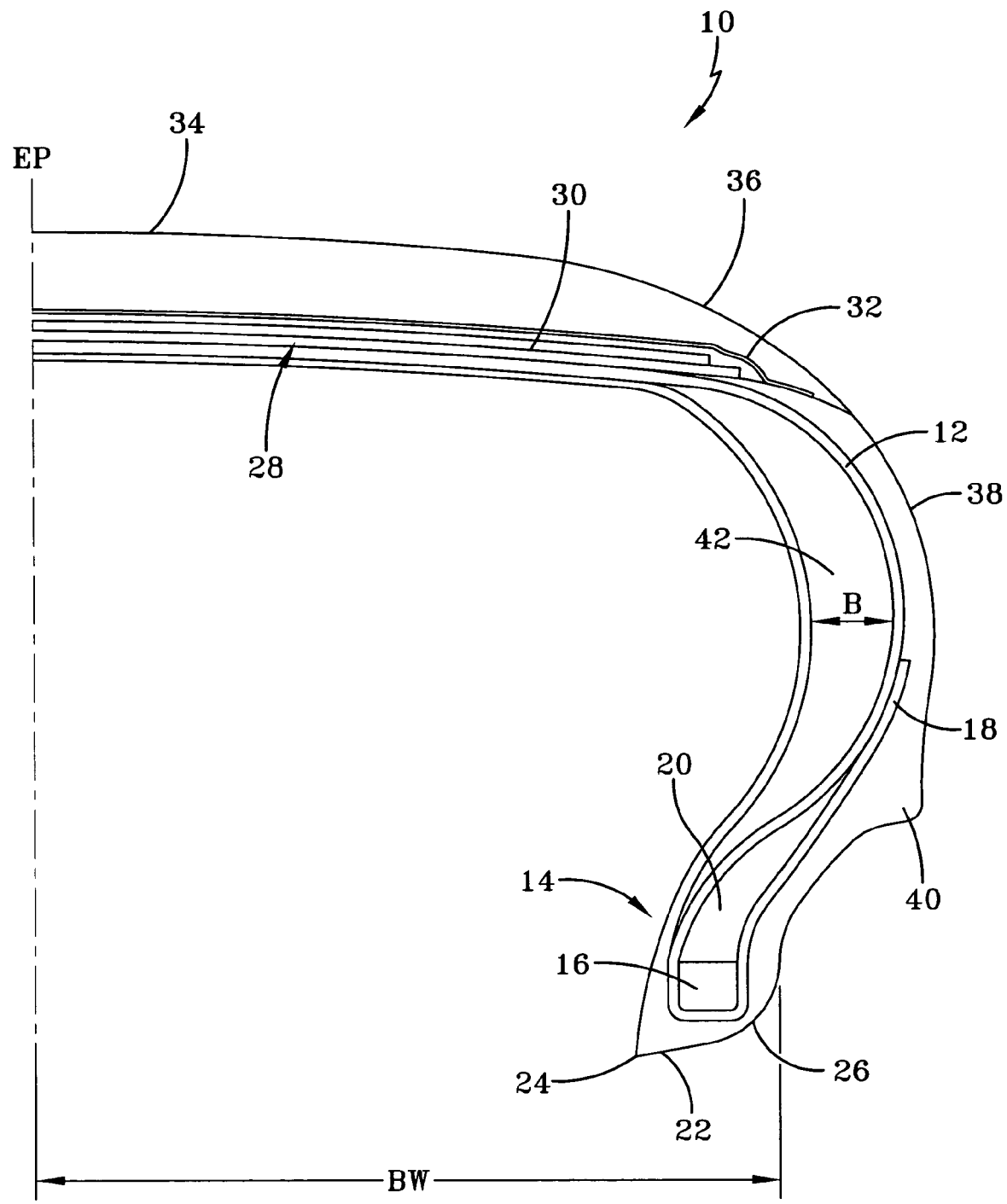
FIG. 1 is a cross-sectional configuration of one half of a self-supporting run-flat tire.

FIG. 1 is a self-supporting run-flat tire 10 in accordance with the present invention. Only one half of the cross-sectional configuration of the tire is illustrated. It will be readily understood by those in the art that the non-illustrated half of the tire is the mirror-image of that which is illustrated, absent any specific indication of an asymmetrical tire. The tire 10 has a carcass comprising a reinforcing ply 12 that extends from one bead portion 14 to an opposing bead portion 14. The ends of the reinforcing ply 12 pass radially inward of an inextensible bead core 16 and form a turn-up portion 18 that extends toward the maximum sectional width or the mid-height of the tire 10.

In the bead portion 14, and radially outward of the bead core 16 and between the main portion of the reinforcing ply 12 and the turn-up portion 18 is a bead apex 20. The apex 20 is typically formed of a relatively high Shore A hardness material. Each bead portion 12 is defined by a bead base 22, a bead toe 24, and a bead heel 26. The bead base 22 is the approximately cylindrical portion of the bead portion 12 that forms its inside diameter. The bead toe 24 is the part of bead portion 12 that joins the bead base 22 and the inside surface of the tire 10 and is axially inward of the bead heel 26; the bead heel 26 being the part of the bead portion 12 that joins the bead base 22 and the outer surface of the tire 10. The molded bead width BW is the axial distance measured between opposing bead heels 26. The bead portion may also include other non-illustrated elements such as flippers, chippers, toe guards and chafers.

Radially outward of the main portion of the carcass reinforcing ply 12 is a belt structure 28. The illustrated belt structure 28 has two plies 30 formed from inclined parallel reinforcing cords. The cords are inclined at an angle of 17° to 27° relative to the equatorial plane EP of the tire 10. The cords in each ply 30 are crossed at an equal and opposing angle to the cords in the adjacent ply 30. Outward of the two inclined cord plies 30 is an overlay 32. The overlay 32 is formed of cords inclined at 0° to about 5° relative to the equatorial plane EP. While illustrated radially outward of the inclined cord plies 30, the overlay 32 may actually be located between the inclined cord plies 30 or radially inward of the inclined cord plies 30.

Outward of the belt structure 28 is the tread 34 that forms the ground contacting surface of the tire. Extending from the tread edges 36 are the tire sidewalls 38. The lower portion of the sidewall is defined by a protective rib 40. The location of the protective rib 40 is dependent on the tire height; the rib 40 is located relatively higher up the sidewall 38 when the tire height is smaller, and the rib 40 is located relatively lower along the sidewall 38 when the tire height is greater.

Axially inward of the carcass reinforcing ply 12 and in the sidewall 38 of the tire 10 is an elastomeric insert 42. The shape of the insert 42 is described as being substantially crescent in shape, or lenticular. This is intended to also include an entrunkated crescent shape, particularly where the entrunkated portion of the crescent shaped insert is juxtapositioned to the tire's bead portion. The insert 42 preferably has a maximum thickness B at a location between the tread edge and the radial location of the maximum section width of the tire. The function of the insert 42 is to stiffen/support the sidewall 38 of the tire 10 when the tire 10 is operated at reduced or insignificant inflation pressure.

The rubber based inserts 42 are elastomeric in nature having a substantially crescent cross-sectional shape and material properties selected to enhance inflated ride performance while promoting the tire's run-flat durability. The inserts 42, if desired, may also be individually reinforced with cords or short fibers. Thus, one or more of such inserts 42 may be so reinforced.

The insert 42 has a Shore A hardness at 100° C. in a range of about 65 to about 90. Regarding additional properties of the insert 42, the properties disclosed in U.S. Pat. No. 6,230,773 are suitable for the insert 42 of the present invention. The properties may be achieved by the compound disclosed in the referenced US patent, or other compounds may be selected which yield the disclosed properties.

Figure 2:
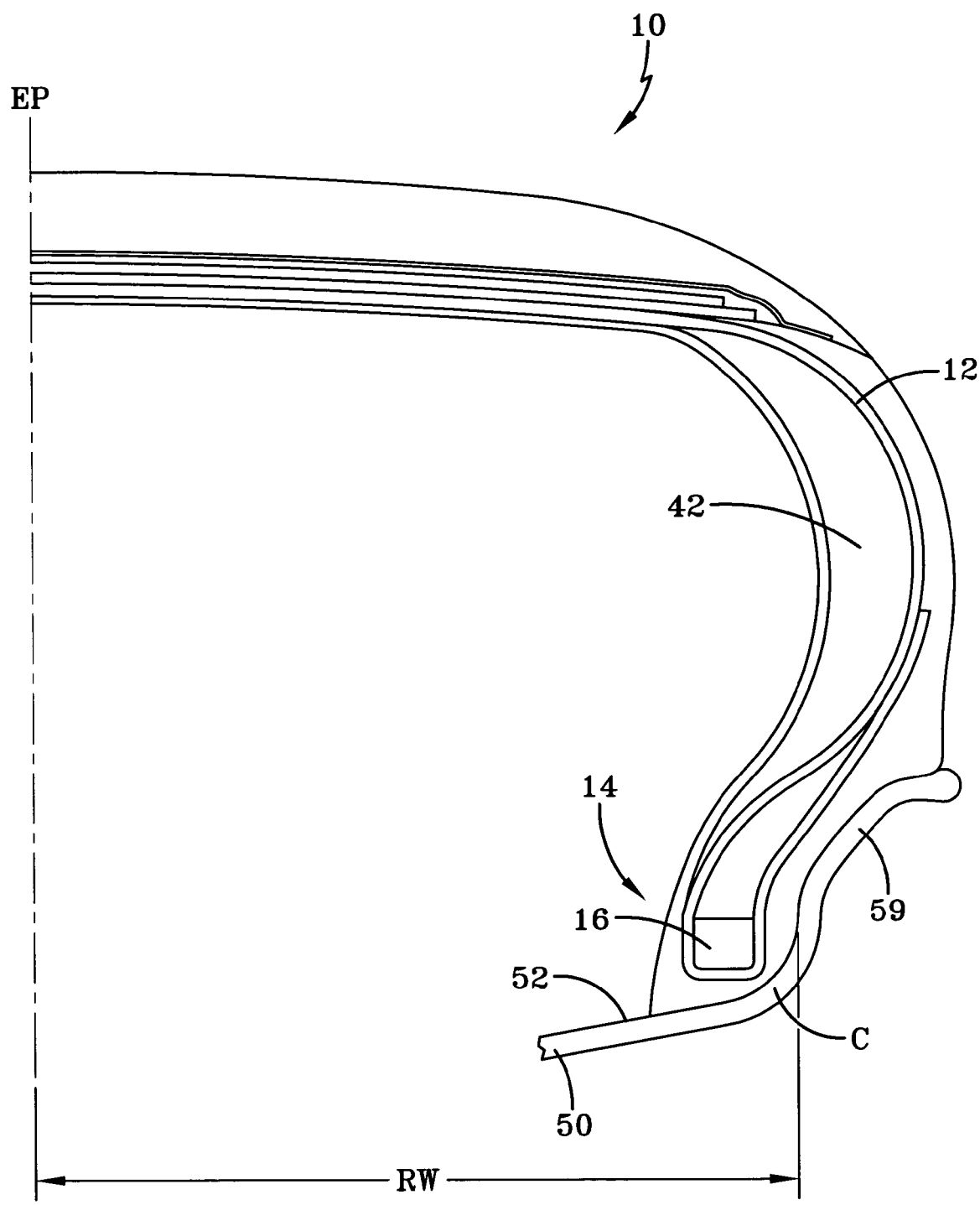
FIG. 2 is a cross-sectional configuration of the tire mounted on a wheel rim.

FIG. 2 shows the tire 10 of FIG. 1 mounted on a tire rim 50. The tire rim 50 has a design and rim width as specified by the industry standards in effect in the world region in which the rim 50 and tire 10 are to be used. Where the tire rim 50 contacts the tire 10, the rim 50 has two main components, the bead seat 52 and the rim flange 59, the seat 52 and flange 59 connecting at a point C. The rim 50 has a maximum axial width RW.

In accordance with the present invention, the molded bead width BW is less than or equal to the rim width RW. This is contrary to conventional wisdom of self-supporting tires that mold the tires 10 to have a molded bead width BW greater than the rim width RW so as to use the extra tension generated to hold the tire onto the rim. Applicants determined via studies that molding the self-supporting tire 10 to have a bead width BW at maximum equal to the rim width RW can improve performance of the tire 10 without negatively affecting the tire performance.

Four identical run-flat tires, of 215/45R17 size, were compared using FEA analysis. All the modeled tires had a general internal construction as illustrated in FIG. 1. Two of the modeled tires had a molded bead base width of 7.0 in (17.78 cm) and the remaining two tires having a molded bead base width of 7.5 in (19.05 cm). One tire of each size was modeled as mounted on a rim having a rim width corresponding to the molded bead width. The other tires were modeled as mounted on rims having a rim width different from the molded bead width. The tires were subject to numerous analyses, including deflection, strain, and loading. Data is set forth in Table 1 below. The tire/rim combination having the molded base width greater than the rim width, i.e. the conventional combination, is used as the reference tire/wheel combination.

TABLE 1

| Tire/Rim Combination | Reference | A | B | C |
|---|---|---|---|---|
| Molded Bead width | 7.5 | 7.0 | 7.5 | 7.0 |
| Rim width | 7.0 | 7.0 | 7.5 | 7.5 |
| Inflated Condition | | | | |
| Vertical Deflection, mm | 19.57 | 20.82 | 19.83 | 21.13 |
| Vertical Stiffness, N/mm | 242.1 | 227.4 | 240.7 | 220.5 |

Based on the test results, during inflated performance, there was an increase in the vertical deflection when the molded bead width is equivalent to the rim width. This result is more pronounced for the smaller width rim. When the molded bead width is less than the rim width, the vertical deflection is even greater. For all three non-conventional run-flat tire/rim combinations, there is also a corresponding reduction in vertical stiffness, with a greater reduction in stiffness for the smaller of the two molded bead widths.

Figure 3:
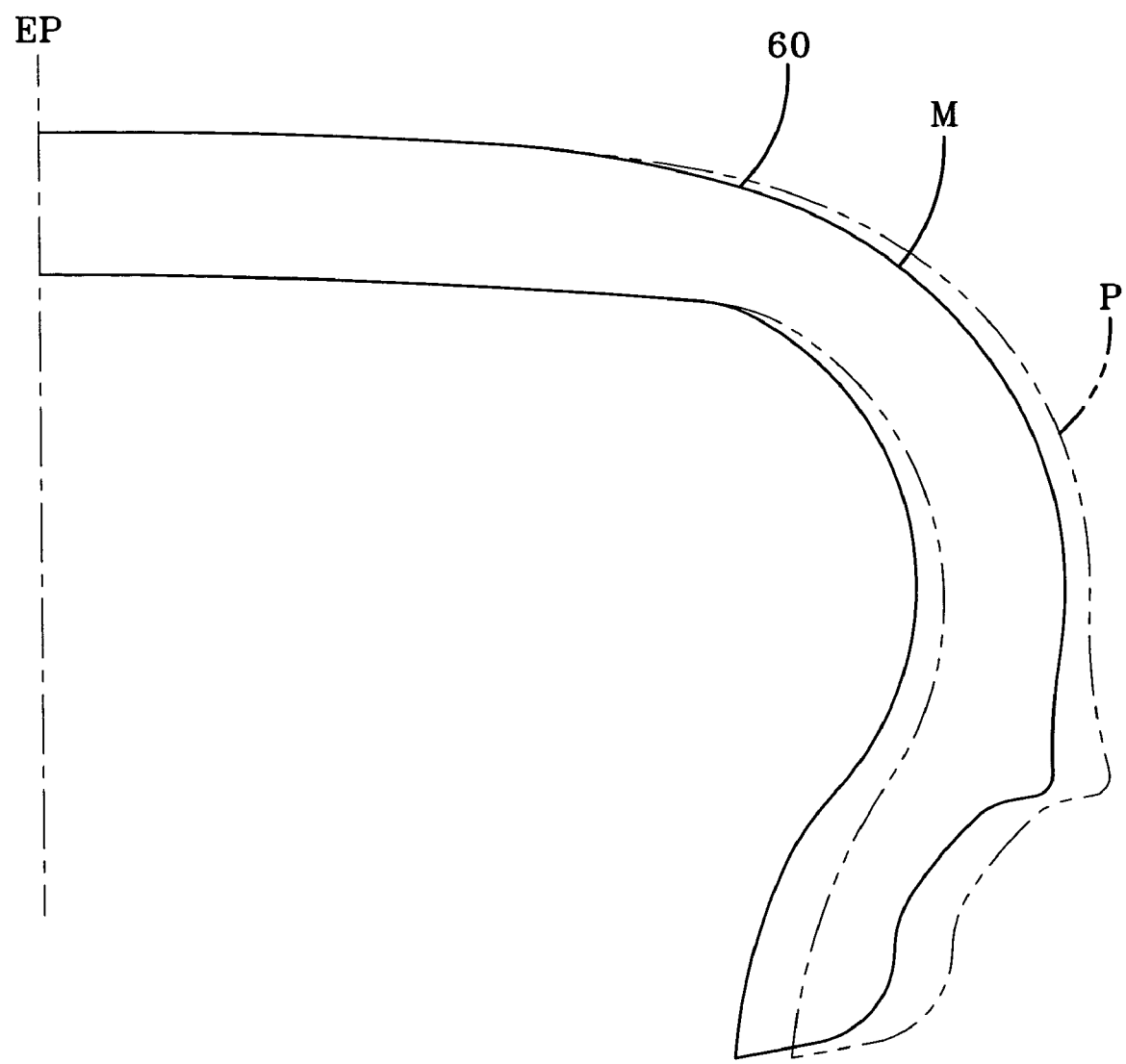
FIG. 3 is an outline overlay of a tire molded in accordance with the invention and a conventionally molded tire.

The decreased spring rate, and thus, less stiff tire during inflated operation, may be partially due to a new crown contour generated when the molded bead width is reduced, see FIG. 3. The outline of the two tires is for identical constructed tires, except that tire M is molded with a bead width equal to the tire rim width, while tire P is molded with a bead width greater than the tire rim. The two outlines are matched at the equatorial plane EP of the tires M, P. As seen, the crown contour is changed, radially dropping the shoulder 60 of the tire M and bringing the maximum section width of the tire M axially inward, relative to the conventional tire P. For a tire of size 215/45R17, this change in contour can result in a tire mass reduction of about 300 grams. For other size tires, a change in crown contour and a corresponding reduction in tire mass is also expected.

Table 2 below shows the strain energy density (SED) for the sidewalls of the conventional run-flat tire/rim and tire/rim combination A. The SED is measured during inflated and loaded conditions. For the tire having a molded bead width greater than the rim width, after mounted and when inflated and loaded, the strain is at a maximum at the axially inner portion of the insert located on the tread side of the maximum section width of the tire. This maximum SED occurs at the tire location where the tire will flex the greatest amount during deflated operation. For the tire having a molded bead width BW equal to the rim width RW, the maximum SED is in the same general location as for the conventional tire/rim combination; however, the SED is significantly reduced, by approximately 27.5%, and is more evenly spread out through the tire sidewall 38.

TABLE 2

Strain Energy Density

| Tire/Rim Combination | Reference | A |
|---|---|---|
| Molded Bead Width, inches | 7.5 | 7.0 |
| Rim Width, inches | 7.0 | 7.0 |
| Maximum SED (J/mm³) | 0.08 | 0.058 |

Also, in an effort to explain the differences in the inflated deflection and inflated SED's for the tire different tire/rim combinations, carcass reinforcing ply loads for the two tire and rim combinations were determined. The results are shown in Table 3 below. The maximum ply cord loading occurs in the apex area, on the inner side of the tire, prior to the carcass turnup radially outward of the bead core. For the tire having a molded bead width the same as the rim width, the maximum ply cord force is reduced by approximately 12%.

TABLE 3

Ply Load

| Tire/Rim Combination | Reference | A |
|---|---|---|
| Molded Bead Width, inches | 7.5 | 7.0 |
| Rim Width, inches | 7.0 | 7.0 |
| Max ply cord force (N) | 13 | 11.4 |

The reasoning behind the difference in the ply loading of the inner portion of the carcass is that during mounting of the greater bead width tire, the ply encapsulated apex 20 is forced to bend outward. This rotation movement causes the carcass reinforcing ply 12 to load, effectively increasing the bending stiffness of this lower apex region. Consequently, during inflated vertical loading, since the apex region has been in effect stiffened due to mounting, the deformation of the sidewall 38 is concentration in the insert 42.

For the smaller molded bead base width tire, the bending stiffness of the apex region is lower, as the apex 20 is not forced to bend outward during mounting. Thus, the apex 20 is not pre-loaded and is able to share some of the bending of the sidewall 38, distributing any deformation over a larger area. This in effect softens the sidewall beam structure created by the combination of the insert, apex, and ply, hence more inflated vertical deflection.

To determine the run-flat distance of the self-supporting tire molded with the smaller than conventional base width, two tires of size 245/45R17 were built, having the same internal construction. Both tires were self-supporting run-flat tires. The results are presented in Table 4.

TABLE 4

Run-Flat Performance

| Tire/Rim Combination | Reference | D |
|---|---|---|
| Molded Bead Width, inches | 8.5 | 8.0 |
| Rim Width, inches | 8.0 | 8.0 |
| Kv @ 2.0 bar, N/mm* | 235 | 230 |
| Runflat Distance (km)** | 31 | 58 |

*vertical stiffness
**run at 80 km/h

Based on these results, it was determined that the ride comfort can be improved, durability of the tire, and greater performance can be achieved when the self-supporting run-flat tire is molded such that the molded bead base width is equal or less than the rim width of the intended rim upon which the tire is to be mounted.

Figure 4A:
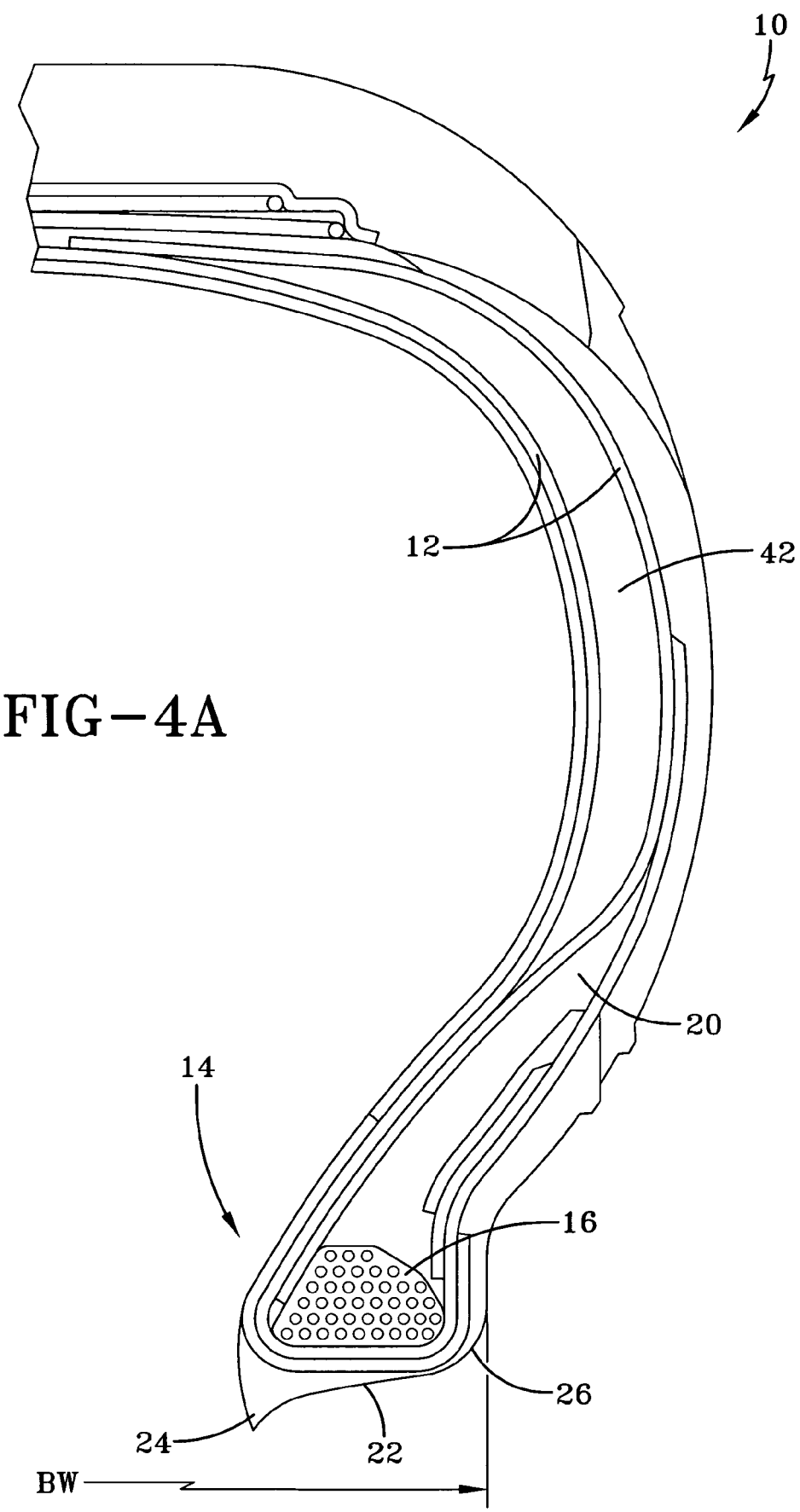
FIGS. 4a and 4b are alternative embodiments of the tire.
Figure 4B:
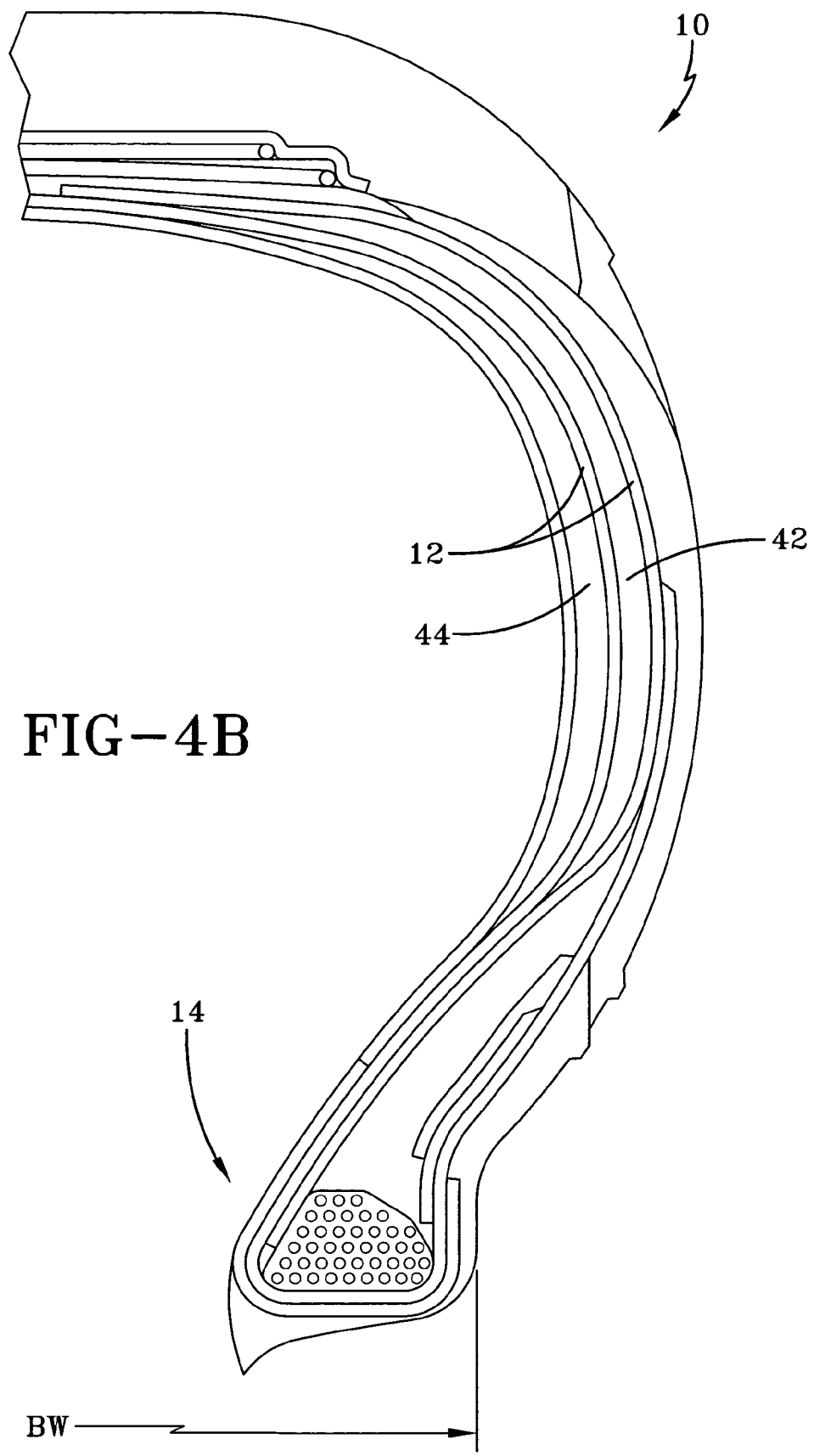

FIGS. 4a and 4b depict alternative constructions for the run-flat tire. For elements that are identical to the tire of FIG. 1, the same reference numerals will be employed. In the tire of FIG. 4a, the carcass reinforcing structure has two plies 12. The insert 42 is located between the two plies 12. In the tire of FIG. 4b, there are two inserts 44, 46 and two plies 12 for the carcass reinforcing structure. The first and radially inner insert 44 being located between the inside of the tire 10 and the first carcass ply 12 and the second and radially outer insert 46 being located between the two plies 12. The total gauge of the two inserts 44, 46 has a gauge corresponding to the maximum gauge range for a single insert 42 of the other illustrated tires, such as that of FIG. 1 or 4a. The maximum gauge for the inserts is 4.0 to 10.5 mm.

What is claimed is:

1. A tire and rim combination wherein the tire is mounted on the rim, the tire having a carcass, a tread, and a belt reinforcing structure located radially outward of the carcass and radially inward of the tread, the carcass comprising a reinforcing ply structure extending between a pair of bead portions, each bead portion having a bead heel with the molded axial distance between the opposing bead heels being a distance BW, a pair of sidewalls, each sidewall located radially outward of one of the pair of bead portions, and a self-supporting run-flat insert located in each sidewall and the rim having a pair of opposing bead seats and opposing rim flanges, each bead seat and rim flange meeting at a junction, the axial distance between the junctions being a distance RW, the rim distance RW being greater or equal to the tire distance BW, wherein the tire is mounted on the rim such that the bead heel is in contact with the rim junction, and after inflation of the tire on the rim, the inserts are not subjected to additional stress upon inflation.

2. The tire and rim combination of claim 1, wherein the self-supporting insert in each sidewall is located axially inward of the carcass reinforcing ply structure, outward of a tire innerliner.

3. The tire and rim combination of claim 1, wherein the bead portions comprise bead cores, one bead core located in each bead portion, and the reinforcing ply structure is comprised of a pair of parallel cord plies, the ends of one of the parallel cord plies extending about the bead cores, and the self-supporting inserts are located between the pair of parallel cord plies.

4. The tire and rim combination of claim 1 wherein the self-supporting run-flat insert is formed of two different elastomeric materials.

5. The tire and rim combination of claim 1 wherein bead portions comprise bead cores, one bead core located in each bead portion, and the self-supporting insert has a radially outer end and radially inner end, the radially outer end being located radially inward of the belt reinforcing structure and the radially inner end of the self-supporting insert is located radially outward of the bead cores.

6. A method of mounting a self-supporting run-flat pneumatic tire, the method comprising the following steps:

a) forming a cured pneumatic tire, the tire having a carcass, a tread, and a belt reinforcing structure located radially outward of the carcass and radially inward of the tread, the carcass comprising a reinforcing ply structure extending between a pair of bead portions, a pair of sidewalls, each sidewall located radially outward of one of the pair of bead portions, and a self-supporting run-flat insert located in each sidewall, wherein each bead portion has a bead heel at the axially outermost point of the bead portion, the axial distance between opposing bead heels being a distance BW, b) providing a rim upon which the tire will be mounted, the rim having a pair of opposing bead seats and opposing rim flanges, each bead seat and rim flange meeting at a junction, the axial distance between the junctions being a distance RW, the rim distance RW being greater or equal to the tire distance BW, and c) mounting the tire on the rim wherein the bead heel is in contact with the rim junction.

* * * * *